Patented July 25, 1950

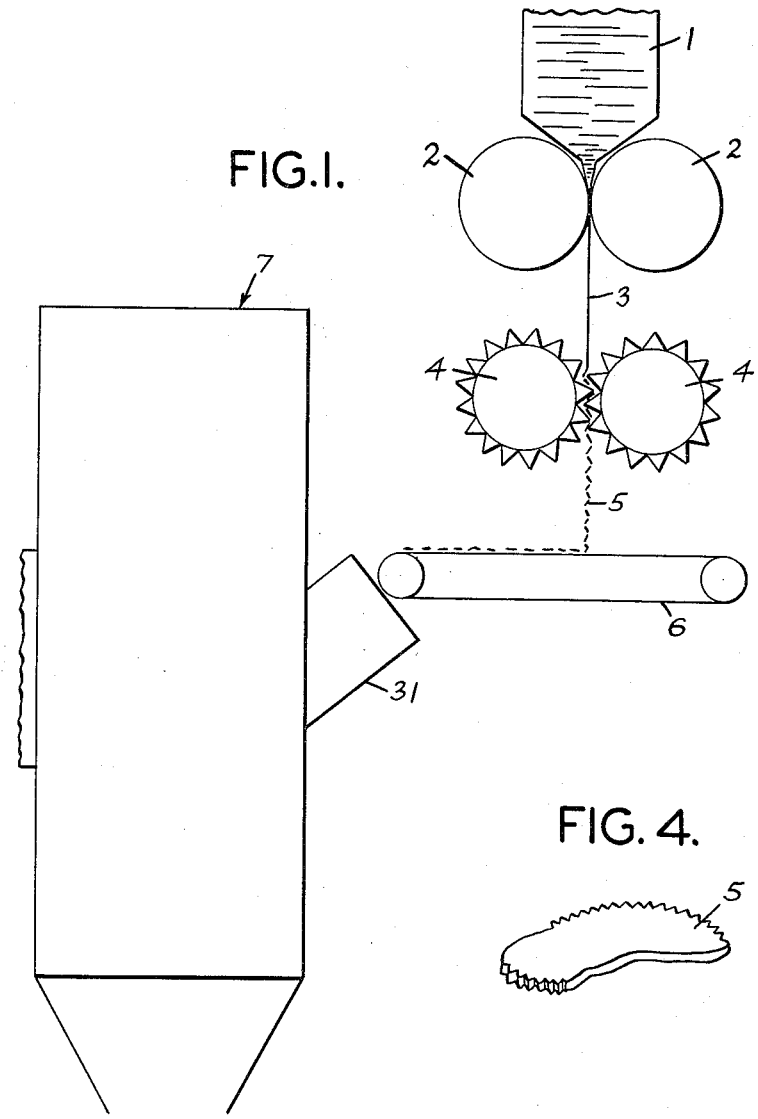
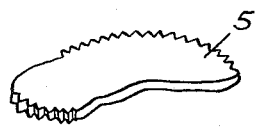

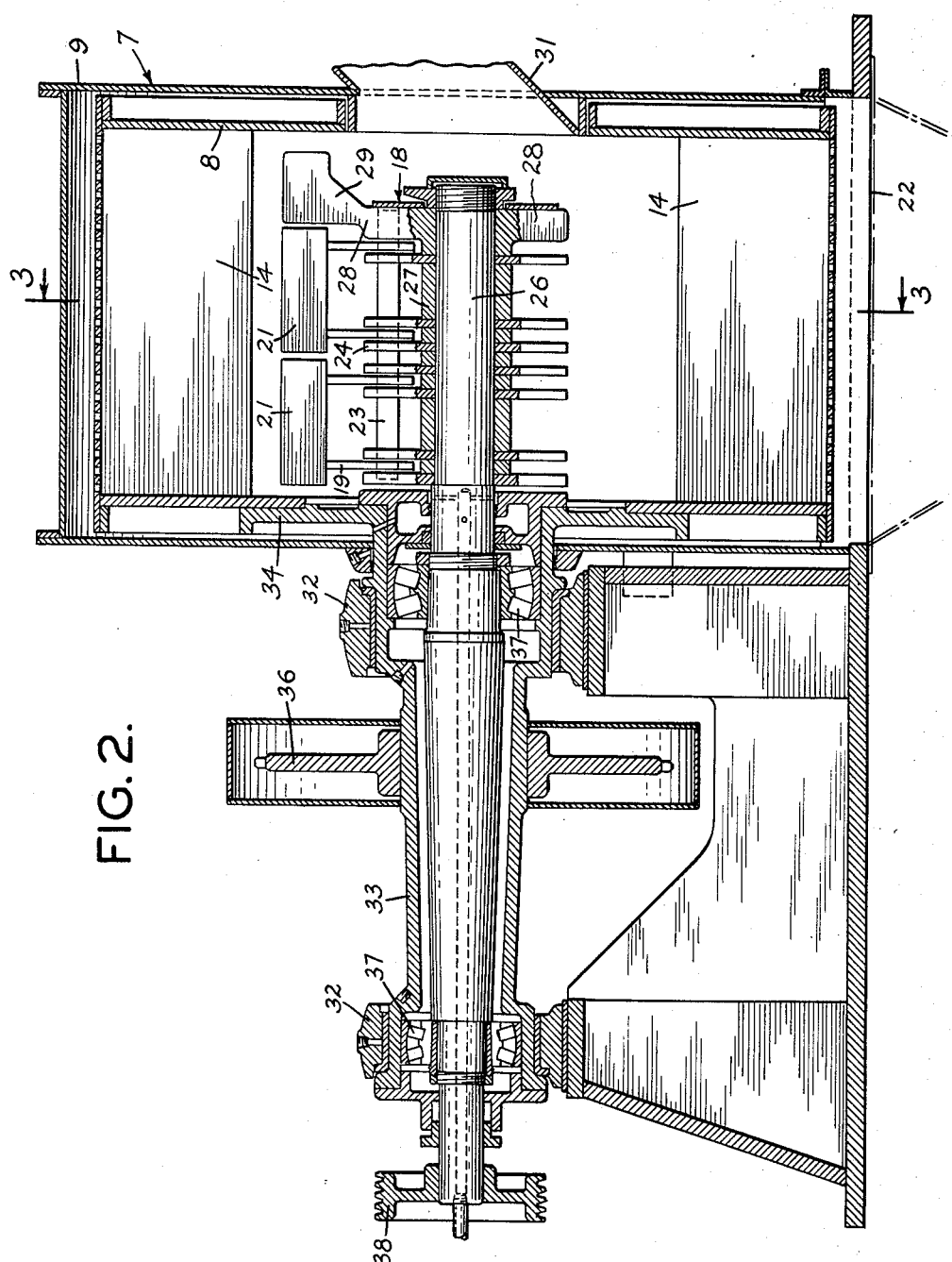

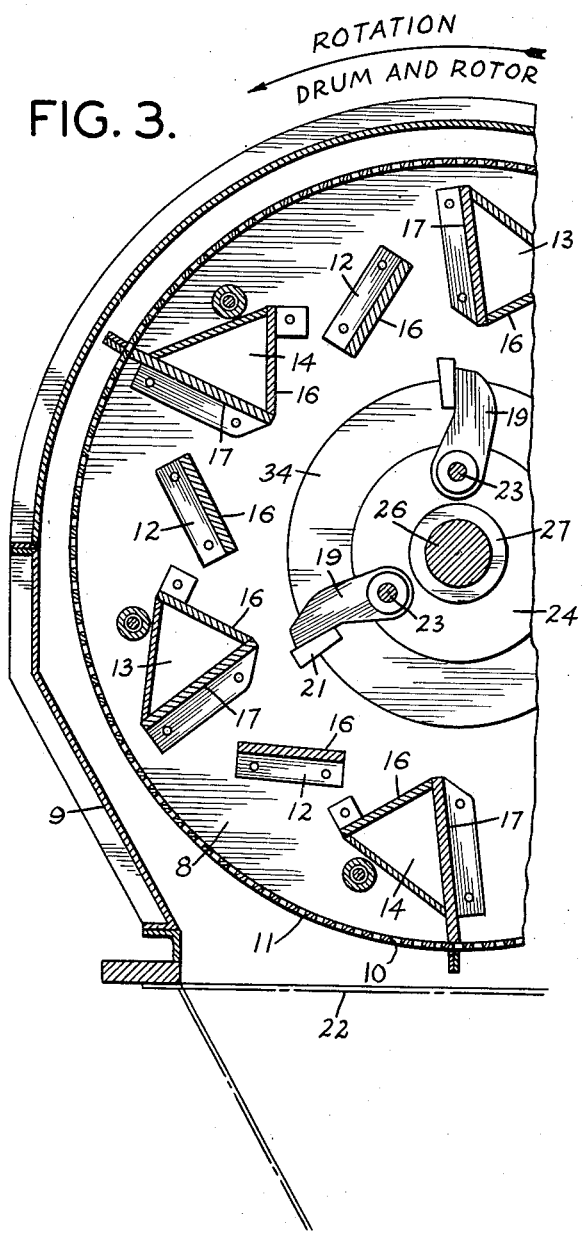

2,516,295

UNITED STATES PATENT OFFICE 2,516,295

PROCESS FOR PREPARING HOMOGENEOUSLY PARTIALLY POLYMERIZED PARTICLES OF THERMOSETTING MATERIAL

George W. Borton, Philadelphia, and Stanley D. Hartshorn, Wayne, Pa., assignors to Pennsylvania Crusher Company, Philadelphia, Pa., a corporation of New York Application August 9, 1946, Serial No. 689,372

2 Claims. (Cl. 18—47.5)

This invention relates to the manufacture of plastics and more particularly to a system for the production of uniform moldable plastic particles.

It is an object of this invention to provide a process for preservation of homogeneous polymerization of a plastic by uniform reduction to small particles.

It is a further object of this invention to provide a process for reduction of a plastic material to homogeneously polymerized particles.

Other and further objects will appear from the following description taken together with the figures in which:

Fig. 1 is a side view of apparatus for preparing and reducing a polymerizable substance;

Fig. 2 is a vertical longitudinal sectional view of a bradmill;

Fig. 3 is a vertical section taken on line 3—3 of Fig. 2;

Fig. 4 is a perspective view of a particle after breaking the polymerizable substance in the saw-tooth crusher of Fig. 1 and before reduction in the bradmill of Fig. 2; and Fig. 5 is a perspective view of a typical particle after reduction.

In general, this invention relates to the preparation of a polymerizable material in which a partially polymerized material is rapidly reduced to particles to maintain a homogeneity of polymerization.

Referring to Fig. 1, a vat 1 is shown in which is placed a plastic such as a phenol-formaldehyde condensation product. When passed into the vat 1 this plastic has been processed to the point where it is soft when heated and hard when cooled and is homogeneously in a stage of partial polymerization. The plastic mass is maintained in a heated, and plastic, homogeneous condition in the vat 1 and is fed in this condition from the vat 1 into the heated rolls 2 where it is compressed into a strip 3 approximately ¼" in thickness. By attenuating the plastic mass into a thin strip it can be cooled rapidly. This rapid cooling is important in bringing about a uniform decrease in the rate of polymerization which is reduced upon the cooling of the plastic. As the strip is cooled almost instantaneously upon leaving the rolls 2, and the rate of polymerization correspondingly affected, the polymerization of all portions of the strip 3 is substantially homogeneous and a stiff strip of homogeneously, partially polymerized plastic is obtained. The brittle strip 3 is subsequently fed into a saw-tooth crusher 4 which chops the pieces 3 up into pieces 5 of approximately ½" to 1½" in width or length and ¼" in thickness. A typical chip 5 formed by breaking the strip 3 in the crusher 4 is shown in Fig. 4.

The chips 5 fall from the saw-tooth crusher 4 onto a continuous belt 6 which carries them to the bradmill crusher 7. The bradmill crusher 7 shown in Fig. 2 is comprised of a drum 8 rotating on a horizontal axis in a casing 9.

Fig. 3 is a radial section of the bradmill showing the drum 8 rotating counterclockwise and having a screen 11 around its perimeter perforated with perforations 10 to permit passage of particles 15 of the order of 10 mesh sieve size. The shelves 12, 13 and 14 are positioned in the drum 8 having impact surfaces forming angles of 20 degrees to 35 degrees with the radius of the drum 8.

A hammer carrying rotor assembly 18 rotates counterclockwise coaxially with drum 8 and carries hammers 19 for striking the polymerizable material with surfaces 21. The chips 5 when struck by the fast-moving surfaces 21 are fractured by the impact and thrust against the surfaces 16 of the shelves 12, 13 and 14. The resulting particles 15 suffer further fracturing by the second impact and either fall to the screen 11 or continue to be struck by impact surfaces 16 and 21 until they fall to the screen 11. The shelves 13 and 14 alternate with the shelves 12 and in every succession of four shelves there is one shelf 13 and one shelf 14 separated by a shelf 12. The carrying surfaces 17 of the shelves 14 extend to and are contiguous with the screen 11 while the carrying surfaces 17 of the shelves 13 extend toward but are spaced away from the screen 11. The shelves 12 having no carrying surfaces are spaced further away from the screen 11 than the carrying surfaces 17. The particles 15 on the screen 11 are therefore free to slide under the shelves 12 and 13 and catching on the surfaces 17 are carried upward with the rotation of the drum 8. In the sliding action of the fractured particles on the moving screen 11 the particles are tumbled over each other and those less than a predetermined size set by the perforations 10 pass through the perforations 10 and into the casing 9 from which they fall through a discharge opening 22. The particles greater than the predetermined size and too large for passage through the perforations 10 are carried upward on the surfaces 17 by the rotation of the drum and at the top of the cycle drop off into the path of the hammer surfaces 21 and are subjected to further fracturing by impact. This process is repeated until the particles are reduced to such size as will pass through the perforations 10. The carrying surfaces 17 of the shelves 13 while not extending to the screen 11 so as to carry large particles serve to limit the quantity of particles sliding to the shelf 14 by holding up any pile of particles that may build up on the screen.

As shown in Fig. 2, the hammers 19 are hung on bars 23 inserted in plates 24 fastened together on a shaft 26 by collars 27 to form a rotor assembly 18. On the end of shaft 26 is provided an L-shaped member which forms a rigid hammer 28 having impact surfaces 29. This hammer 28 and its surfaces 29 cooperate with the hammers 19 and the surfaces 21 to fracture the particles 5.

The chips 5 are fed into the drum 8 through a chute 31 formed in one side of the casing 9. The drum 8 and the shaft 26 are driven through an opening in the side of casing 9 opposite chute 31. A pair of pulley blocks 32 support a rotatable quill 33 which carries the drum 8 on a flanged end 34 extending into the casing 9. The quill 33 is turned by sprocket 36 driven by suitable means. The shaft 26 is carried inside the quill 33 on bearings 37 and the shaft is driven by a pulley 38 powered by suitable means.

The process operates as follows: A polymerizable substance such as phenol-formaldehyde condensation compound which has been prepared and has polymerized into a plastic mass when heated is placed in the vat 1. This mass continues to polymerize in the vat 1 and would eventually assume a hard and infusible nature. While the mass in the vat 1 is in the plastic when hot but stiff when cool state, it is fed out of the vat 1 through heated rolls 2 which compress the mass into a thin wide strip of approximately ¼" thickness. This thin strip 3 is rapidly and evenly cooled because of its thinness and the rate of polymerization which is substantially lowered by the decrease in temperature is uniformly reduced for all parts of the strip as it leaves the rolls 2. The homogeneity of the partial polymerization thus attained in the material strip 3 is preserved by rapidly reducing the plastic to particles 15 of uniform size in which size the further polymerization of the plastic is uniform. To obtain this reduction the hardened strip is immediately cracked up in the saw-tooth crusher 4 and the particles 5 of plastic material from the crusher 4 drop onto a continuous belt 6 and are carried down to chute 31 of the bradmill 7. The particles 5 dropping into the chute 31 slide into the rotating drum 8 and are picked up on the shelves 12, 13 and 14 by the rotation and carried upward to the top of the cycle from which they are dropped into the path of the rapidly rotating rotor 18 and struck by the hammer surfaces 21 to be fractured by impact. After bouncing off the impact surfaces 21 and 16, as before mentioned, the fractured particles 15 collect on the screen 11 and sliding over the screen upon rotation of the drum 8 the smaller particles fall through the perforation and out into casing 9 thence through discharge opening 22. As before mentioned, those over-size particles too large to pass through the perforations 10 are carried upward by the rotation of drum 8 for a repetition of the fracturing procedure.

It is desired to remove the particles 15 from the bradmill 7 as soon as they have been reduced to the proper size for passage through screen 11. It is also necessary to reprocess those oversize particles which have not been sufficiently reduced. To separate the two sizes the mixture of particles 15 that falls on the screen 11 slides over the screen 11 as the drum 8 rotates. This sliding tumbles and tosses the loose particles 15 on the rotating surface of screen 11 so that the 10-mesh sieve particles are given an opportunity to drop through the perforations 10 before being carried upward and unnecessarily reprocessed. The carrying surface 17 of the shelf 13 assists in obtaining a good mixing of the various sized particles by leveling off the particles that have fallen onto the screen 11 and preventing a pile-up which would trap the under-size particles away from the screen.

By this process a particle of the strip 3 is broken, fractured, sorted and passed out for further processing in a short time. A particle is reduced to a desired size quickly to prevent any more polymerization of large particles than is necessary. This is important as uneven polymerization decreases with the size of the individual particle of polymerizable plastic. In small polymerizable particles the condensation process is essentially equal in all parts of the particle and equivalent sizes of polymerizable particles under equivalent conditions have equivalent rates of polymerization. Therefore, the preservation and creation of homogeneity in the polymerization of a condensation product or other polymerizable plastic is aided by reducing the plastic to particles in which the rate of polymerization will be substantially the same for all parts of the material in all the particles.

This process achieves the preservation of homogeneity of the polymerization by minimizing the period during which the polymerizable material is formed in large pieces and by reducing it to small particles as rapidly as possible. This process also has the advantage of subjecting the polymerizable material to fracturing only to the extent that is necessary for attaining the desired small particle by removing the small particle from the fracturing device as soon as it has achieved the desired smallness. The final product has a very small percentage of dust due to the perpetual alternate screening and crushing so that the finer particles are screened out as soon as they are produced. The rate of pour, for instance, through a funnel orifice, is excellent as is the weight per cubic centimeter, the size of the particles being graduated and averaged to very compactly fill in the intervening spaces.

Various modifications of the apparatus disclosed may be employed in carrying out the method of this invention. For instance, the saw-tooth crusher 4 may be of the single roll type and the times of treatment will be regulated according to the characteristics of the material. After the preliminary polymerization the material is cooled and kept below a temperature at which there is any substantial polymerization so that the final crushing may be timed at any convenient interval. The invention is not intended to be restricted to the specific embodiments shown but is intended to cover such modifications thereof as fall within the appended claims.

What is claimed is:

1. A process for preparing homogeneously partially polymerized particles of plastic material suitable for storing prior to molding and complete polymerization comprising preparing the material for a composition setting under the action of heat, giving the material a preliminary heat treatment to partial polymerization and cooling said material substantially instantaneously to hardened condition of predetermined desired thinness and brittleness preparing the material to be fractured by a hammer blow against freely suspended pieces, immediately reducing said thin material to pieces of desired small size, maintaining said material below a temperature at which there is any substantial polymerization, then introducing said thin pieces as freely-moving units into the path of a fast-moving surface and subjecting said pieces while freely moving to fracture by said fast-moving surface, projecting the resulting fractured particles from said surface freely through the air against another surface causing further fracture of said particles to smaller size as said particles break themselves against said second surface so that said fracturing is due to the inertia of the pieces and particles when engaged by said surfaces, outwardly discharging fractured particles of predetermined small size from around the periphery of said fracturing operations while retaining over-size particles and inwardly returning them to said fracturing operations, and continuing said steps to reduction of said particles to said predetermined small size and final outward discharge thereof from said fracturing operations while at the same time maintaining uniformity in the partial polymerization of the final particles.

2. A process for preparing homogeneously partially polymerized particles of plastic material as set forth in claim 1 in which the thin pieces of material are approximately ¼" thick and about ½" to 1½" in longest surface dimension.

GEORGE W. BORTON.
STANLEY D. HARTSHORN.

REFERENCES CITED

The following references are of record in the file of this patent:

UNITED STATES PATENTS

| Number | Name | Date |
|---|---|---|
| 1,586,850 | Smith | June 1, 1926 |
| 1,977,771 | McMahon | Oct. 23, 1934 |
| 1,996,757 | Elbel | Apr. 9, 1935 |
| 2,015,711 | Cherry | Oct. 1, 1935 |
| 2,155,150 | Schacht | Apr. 18, 1939 |
| 2,161,748 | Samaras et al. | June 6, 1939 |
| 2,211,518 | Scherbaum | Aug. 13, 1940 |
| 2,229,291 | Groten et al. | Jan. 21, 1941 |
| 2,335,515 | Jehle | Nov. 30, 1943 |
| 2,346,708 | Smidth | Apr. 18, 1944 |